US012759294B2

(12) United States Patent
Miyauchi et al.

(10) Patent No.: US 12,759,294 B2
(45) Date of Patent: Oct. 13, 2026

(54) INK-REPELLENT MEMBER, INKJET HEAD, METHOD FOR MANUFACTURING INK-REPELLENT MEMBER, AND METHOD FOR MANUFACTURING INKJET HEAD

(71) Applicant: CANON KABUSHIKI KAISHA, Tokyo (JP)

(72) Inventors: Yohei Miyauchi, Tokyo (JP); Junri Ishikura, Tokyo (JP); Tadahiro Mimura, Kanagawa (JP); Koji Sasaki, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 316 days.

(21) Appl. No.: 18/519,402

(22) Filed: Nov. 27, 2023

(65) Prior Publication Data

US 2024/0208220 A1 Jun. 27, 2024

(30) Foreign Application Priority Data

Dec. 7, 2022 (JP) ................................. 2022-195669
Oct. 23, 2023 (JP) ................................. 2023-181941

(51) Int. Cl.
*B41J 2/14* (2006.01)
*B41J 2/16* (2006.01)
(Continued)

(52) U.S. Cl.
CPC ............. *B41J 2/1433* (2013.01); *B41J 2/162* (2013.01); *B41J 2/1623* (2013.01); *C08G 77/46* (2013.01); *C09D 5/1675* (2013.01); *C09D 183/12* (2013.01)

(58) Field of Classification Search
CPC ........ B41J 2/1433; B41J 2/162; B41J 2/1623; B41J 2/1606; C08G 77/46; C08G 77/24;
(Continued)

(56) References Cited

U.S. PATENT DOCUMENTS 9,146,462 B2 * 9/2015 Ishizeki .................. C08L 83/08
9,205,652 B2 12/2015 Sameshima et al.
(Continued)

FOREIGN PATENT DOCUMENTS

EP 1 103 581 A2 5/2001
JP 2001-152050 A 6/2001
(Continued)

OTHER PUBLICATIONS

U.S. Appl. No. 18/419,716, filed Jan. 23, 2024, Ishikura et al.
U.S. Appl. No. 18/627,634, filed Apr. 5, 2024, Mimura et al.

*Primary Examiner* — Pamela H Weiss
(74) *Attorney, Agent, or Firm* — Venable LLP

(57) ABSTRACT

An ink-repellent member includes a base and an ink-repellent film. The base includes at least one of silicon oxide and tantalum oxide. The ink-repellent film includes a fluorine compound chemically bonded to the base via at least a siloxane bond. The fluorine compound includes a fluorine compound A having a linear molecular structure and an average molecular weight of 1500 or more, and a fluorine compound B having a linear molecular structure and a smaller average molecular weight than the fluorine compound A. The fluorine compound A has a siloxane structure only at a one end of the linear molecular structure, and the fluorine compound B has a siloxane structure or a phosphonic acid structure only at a one end of the linear molecular structure.

7 Claims, 5 Drawing Sheets

(51) Int. Cl.

| | |
|---|---|
| ***C08G 77/46*** | (2006.01) |
| ***C09D 5/16*** | (2006.01) |
| ***C09D 183/12*** | (2006.01) |

(58) Field of Classification Search

CPC ... C09D 5/1675; C09D 183/12; C09D 183/08

See application file for complete search history.

(56) References Cited

U.S. PATENT DOCUMENTS

| | | | | |
|---|---|---|---|---|
| 9,658,467 | B2 * | 5/2017 | Hervieu | G02C 7/022 |
| 2003/0197758 | A1 | 10/2003 | Sasaki et al. | |
| 2015/0331152 | A1 * | 11/2015 | Fournand | G02B 27/0006 428/447 |
| 2021/0245506 | A1 | 8/2021 | Suzuki et al. | |

FOREIGN PATENT DOCUMENTS

| | | | |
|---|---|---|---|
| JP | 2009-214338 | A | 9/2009 |
| JP | 2015-3483 | A | 1/2015 |
| JP | 2017-121723 | A | 7/2017 |
| JP | 2018-202806 | A | 12/2018 |

* cited by examiner

INK-REPELLENT MEMBER, INKJET HEAD, METHOD FOR MANUFACTURING INK-REPELLENT MEMBER, AND METHOD FOR MANUFACTURING INKJET HEAD

BACKGROUND OF THE INVENTION

Field of the Invention

The present disclosure relates to an ink-repellent member and an inkjet head including the ink-repellent member.

Description of the Related Art

As devices for ejecting ink (hereinafter referred to as inkjet heads), Bubble Jet (registered trademark) that instantaneously vaporizes ink using a heater to cause droplets to fly, a piezo jet that forces droplets using a piezoelectric element, and the like are known. In order to perform high-quality image recording using an inkjet head, ink droplets must be ejected from ink ejection orifices in a good straight line along a predetermined direction. However, if droplet residues adhere to the orifice plate surface around the ejection orifices, when ink droplets are ejected, the ink droplets are dragged by the residues, causing wobbling in the ejection direction, which may result in ink droplets flying out of the predetermined direction. Therefore, in order to suppress adhesion of droplet residues around the ink ejection orifices, a water-repellent film is provided around the ink ejection orifices.

JP 2015-3483 A discloses that a base film made of an inorganic oxide is provided on a nozzle plate surface, and a fluorine-containing silane coupling agent (hereinafter may be referred to as a fluorine compound) is chemically bonded thereto to form an ink-repellent film.

On the other hand, in order to remove paper dust, contaminants, and the like from inkjet heads, it is common practice to clean the head surface using a wiper.

Therefore, an ink-repellent member and an inkjet head having both excellent sliding resistance and ink resistance have been required.

SUMMARY OF THE INVENTION

According to a first aspect of the present invention, an ink-repellent member includes a base and an ink-repellent film. The base includes at least one of silicon oxide and tantalum oxide. The ink-repellent film includes a fluorine compound chemically bonded to the base via at least a siloxane bond. The fluorine compound includes a fluorine compound A having a linear molecular structure and an average molecular weight of 1500 or more, and a fluorine compound B having a linear molecular structure and a smaller average molecular weight than the fluorine compound A. The fluorine compound A has a siloxane structure only at a one end of the linear molecular structure, and the fluorine compound B has a siloxane structure or a phosphonic acid structure only at a one end of the linear molecular structure.

According to a second aspect of the present invention, an inkjet head includes an orifice plate provided with ink ejection orifices. The orifice plate includes a base including at least one of silicon oxide and tantalum oxide, and an ink-repellent film including a fluorine compound chemically bonded to the base via at least a siloxane bond. The fluorine compound includes a fluorine compound A having a linear molecular structure and an average molecular weight of 1500 or more, and a fluorine compound B having a linear molecular structure and a smaller average molecular weight than the fluorine compound A. The fluorine compound A has a siloxane structure only at a one end of the linear molecular structure, and the fluorine compound B has a siloxane structure or a phosphonic acid structure only at a one end of the linear molecular structure.

According to a third aspect of the present invention, a method for manufacturing an ink-repellent member includes imparting a fluorine compound A to a base including at least one of silicon oxide and tantalum oxide to chemically bond the fluorine compound A to the base via a siloxane bond, and imparting a fluorine compound B to the base to chemically bond the fluorine compound B to the base via a siloxane bond or a phosphonate ester bond. The fluorine compound A has a functional group capable of forming the siloxane bond at only a one end of its linear molecular structure and an average molecular weight of 1500 or more. The fluorine compound B has a functional group capable of forming the siloxane bond or the phosphonate ester bond at only one end of its linear molecular structure and a smaller average molecular weight than the fluorine compound A.

Further features of the present invention will become apparent from the following description of exemplary embodiments with reference to the attached drawings.

DESCRIPTION OF THE EMBODIMENTS

First Embodiment

Figure 1A:
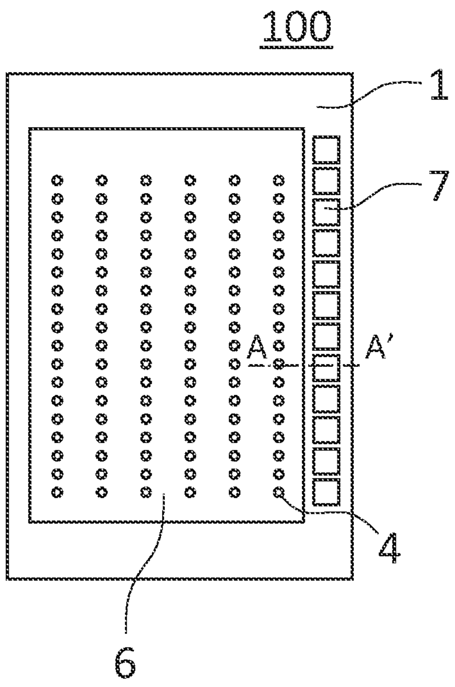
FIG. 1A is a top view of an inkjet head 100 according to an embodiment.

An ink-repellent member, an inkjet head, and others according to embodiments of the present invention will be described with reference to the drawings. In the following description, “ink repellency”, “ink-repellent film”, “ink-repellent member”, and the like may be read as “water repellency", "water repellent film", or "water repellent member", assuming water-based ink. In the following description, "ink repellency", "ink-repellent film", and "ink-repellent member" may be read as "liquid repellency", "liquid repellent film", and "liquid repellent member" because there is no need to necessarily limit the type of liquid or its use when implementing the present invention. The embodiments described below are examples, and for example, detailed configurations can be appropriately changed and implemented by those skilled in the art without departing from the gist of the present invention.

In the drawings referred to in the following description of the embodiments and examples, elements denoted by the same reference numerals have the same functions unless otherwise specified. In addition, "XX or more and YY or less" or "XX to YY" representing a numerical range means a numerical range including end points XX (lower limit) and YY (upper limit) unless otherwise specified. When numerical ranges are described in steps, the upper and lower limits of each numerical range can be combined as desired.

In order to ensure sliding resistance to cleaning operations using a wiper, a silane coupling agent having a large molecular weight of the fluorine-containing portion can be used to form an ink-repellent film by bonding a fluorine-containing silane coupling agent as described in JP 2015-3483 A. This is because the use of a fluorine-containing silane coupling agent having a large molecular weight can be expected to suppress direct contact of the base film and the nozzle plate surface having high frictional resistance with the wiper, even if a part of the ink-repellent film is worn out by the sliding of the wiper. If scratches and cracks on the base film and the nozzle plate surface caused by contact of the wiper can be suppressed, the ink-repellent film can be prevented from peeling off, which would improve durability.

However, the inventors have found that when an ink-repellent film is formed by actually bonding a fluorine-containing silane coupling agent having a large molecular weight to a base film, the ability of the ink-repellent film to repel ink decreases after prolonged contact with ink.

The present inventors have studied to obtain an inkjet head capable of maintaining ink resistance even when a fluorine-containing silane coupling agent having a large molecular weight of a fluorine-containing portion is used. We confirmed that when only a fluorine-containing silane coupling agent having a large molecular weight is used, the ends of the silane coupling agent molecules may not be able to approach the silanol groups formed on the base film because the molecules act as steric hindrance to each other. Then, the ink-repellent film formed by the silane coupling agent becomes a rough film that is not densely formed, and a part of the base film cannot be bonded to the fluorine-containing silane coupling agent and remains exposed. If ink enters through the gaps in the rough ink-repellent film, the ink easily dissolves or erodes the exposed portion of the base film. In particular, dissolution or erosion of the base film is particularly remarkable when alkaline ink comes into contact with a base film having poor alkali resistance. As described above, in the related art ink-repellent film using the fluorine-containing silane coupling agent having a large molecular weight, a part of the base film is easily lost by dissolution or erosion when brought into contact with ink. The inventors found that this caused the ink-repellent film to peel off easily, resulting in reduced ink resistance.

As will be described in detail below, in the present embodiment, two fluorine-containing silane coupling agents, a fluorine compound A and a fluorine compound B, which has a smaller molecular weight than the fluorine compound A, are used as fluorine-containing silane coupling agents that form the ink-repellent film. After the fluorine compound A is given to the base and chemically bonded, the fluorine compound B having a smaller molecular weight than the fluorine compound A is further chemically bonded to form an ink-repellent film.

The fluorine compound B has a smaller molecular weight and less steric hindrance, so it can penetrate into the gaps of the fluorine compound A and chemically bond to the silanol groups in the base that could not react with the fluorine compound A. This makes it possible to form a dense ink-repellent film, suppress exposure of the base film, and obtain an ink-repellent film with both excellent sliding resistance and ink resistance.

Inkjet Head

Figure 1B:
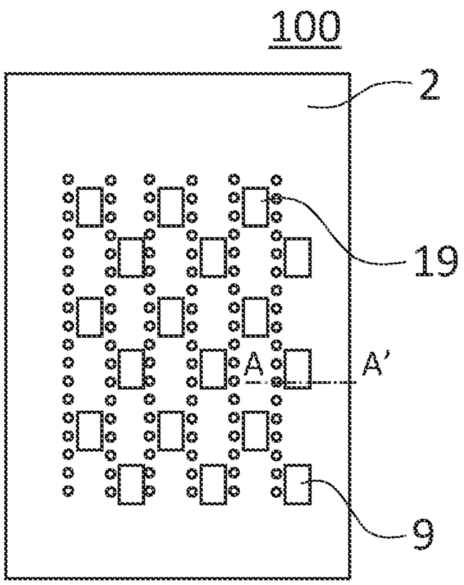
FIG. 1B is a bottom view of an inkjet head 100 according to an embodiment.
Figure 1C:
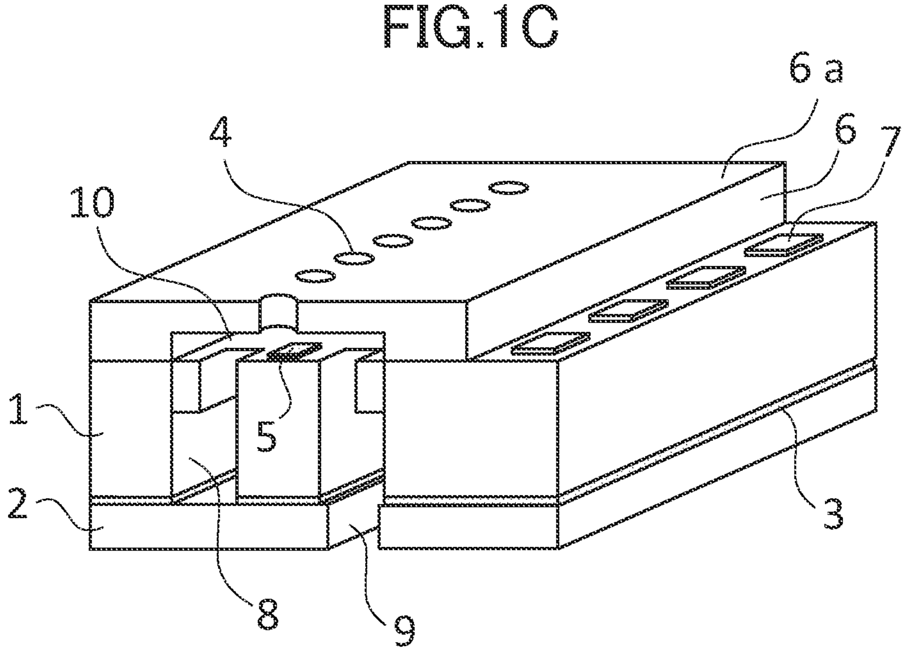
FIG. 1C is a partial perspective view for illustrating a cross section taken along line A-A illustrated in FIGS. 1A and 1B.

First, a configuration of an inkjet head according to an embodiment will be described. FIG. 1A is a top view of an inkjet head 100 according to an embodiment of the present disclosure, and FIG. 1B is a bottom view of the inkjet head 100. FIG. 1C is a partial perspective view for illustrating a cross section taken along line A-A illustrated in FIGS. 1A and 1B.

The inkjet head 100 includes a first flow path substrate 1 as a first member, a second flow path substrate 2 as a second member, an adhesive layer 3, ejection orifices 4, ejection energy generating elements 5, an orifice plate 6, electrodes 7, and an ink tank chamber. The ink tank chamber is not illustrated in FIGS. 1A to 1C. Furthermore, among the components of the inkjet head, parts that are not directly related to the description of the present invention (for example, electric circuits and wiring) are not illustrated.

The first flow path substrate 1 and the second flow path substrate 2, the first flow path substrate 1 and the orifice plate 6, and the first flow path substrate 1 and the ink tank chamber are joined together via the adhesive layer 3 to form a flow path structure. In the flow path structure, a first through flow path 8 and a second through flow path 9 are formed, and these flow paths communicate with each other to form an ink supply path. For convenience of illustration, only a part of the adhesive layer 3 is shown in FIG. 1C.

The ink is supplied from the ink tank chamber to the liquid flow path 10 through the second through flow path 9 formed in each of the second flow path substrate 2 and the first flow path substrate 1, is given ejection energy by the ejection energy generating elements 5, and is ejected from the ejection orifices 4. The portion of ink not ejected from the ejection orifices 4 returns to the ink tank chamber through the first through flow path 8 formed in the first flow path substrate 1 and the third through flow path 19 (circulation return path) formed in the second flow path substrate 2.

A plurality of ejection orifices 4 are arranged on the orifice plate 6 (ink-repellent member), but the arrangement method (number and position) of the ejection orifices 4 is not limited to the illustrated example. An ink-repellent film to be described later is formed on an outer surface (orifice surface 6*a*) of the orifice plate 6. The first flow path substrate 1 is provided with the ejection energy generating elements 5 for ejecting liquid at positions corresponding to the respective ejection orifices 4, and the ejection energy generating elements 5 are driven in response to electric signals transmitted from the outside via the electrodes 7. The ejection energy generating elements 5 are suitably, for example, electrothermal conversion elements or piezoelectric elements. The material of the orifice plate 6 is preferably silicon, but other materials such as silicon carbide, silicon nitride, various types of glass such as quartz glass and borosilicate glass, various types of ceramics such as alumina and gallium arsenide, and resin such as polyimide may be used. An ink-repellent film containing a fluorine compound is formed on an outer surface of the orifice plate 6, that is, an orifice surface 6*a* which is a surface opposite to the liquid flow path 10.

Base of Ink-Repellent Film

The base of the ink-repellent film provided on the outer surface of the orifice plate 6 (orifice surface 6*a*) includes silicon oxide. Since the base has a hydroxyl group (—OH) on its surface, it can form a chemical bond with a fluorine-containing silane coupling agent having a reactive silyl group. Chemical bonding with the base improves the adhesion of the ink-repellent film. The base of the ink-repellent film may be formed on a base material as a base film or a base layer, but when the base material itself (bulk material) includes an inorganic oxide, the base material itself may be the base of the ink-repellent film.

The silicon oxide preferably includes $SiO_2$ from the viewpoint of easily forming a siloxane bond (Si—O—Si) with the fluorine-containing silane coupling agent. This is because the surface contains many silanol groups (Si—OH) as reaction sites. However, silicon oxides (SiOx) having different oxidation numbers or a mixture thereof may be used. In addition, an oxide other than silicon oxide may be contained in the base. At least one material selected from the group consisting of oxide materials such as zirconia, alumina, titania, hafnia, tantalum oxide, cerium oxide, tungsten oxide, niobium oxide, and yttrium oxide, and composite oxide materials such as indium tin oxide and strontium ruthenium oxide can be used.

The silicon oxide can be formed by, for example, oxidizing silicon as a base material of the orifice plate 6 or silicon carbide (SiC) formed on the base material with heat, plasma, UV, or the like. Alternatively, it can be formed by deposition on a base material by sputtering deposition using a silicon oxide target, an atomic layer deposition (ALD) method, a chemical vapor deposition (CVD) method, a spin coating method, or the like. Further, silicon oxide may be formed on the outer surface of the orifice plate by another method.

Fluorine Compound

In the present embodiment, an ink-repellent film is formed using the fluorine compound A, which is a fluorine-containing silane coupling agent having a linear molecular structure, and the fluorine compound B, which is a fluorine-containing silane coupling agent having a linear molecular structure.

Fluorine Compound A

The fluorine compound A is a fluorine-containing silane coupling agent having a larger average molecular weight larger than the fluorine compound B described below. From the viewpoint of ensuring the sliding resistance of the ink-repellent film, the average molecular weight of the fluorine compound A is preferably 1500 or more, and more preferably 4000 or more. This is because if it is smaller than 1500, sufficient sliding resistance may not be obtained.

The average molecular weight of the fluorine compound A can be calculated as a number average molecular weight by measuring $^{19}$F-NMR. Of the NMR peaks obtained, the area of the peak derived from the terminal $CF_3$ of the main chain structure is calculated. Next, the area of the peak derived from the repeating structure contained in the main chain is calculated, and the obtained value is divided by the peak area of the terminal $CF_3$ to calculate the abundance ratio of the main chain repeating structure when the abundance ratio of the terminal $CF_3$ is 1. The number average molecular weight can be calculated by multiplying the obtained ratio by the molecular weight of each structure and adding them together.

The fluorine compound A has a linear main chain structure, and only a one end of the two ends of the main chain forms a siloxane bond (siloxane structure) with the silicon oxide of the base film. For the formation of a siloxane bond, the fluorine compound A has at least one reactive silyl group represented by the following structural formula (1). The fluorine compound A has a reactive silyl group at only one end, which prevents the fluorine compounds A from reacting with each other.

$Si(Y1)n(OR)m$  Structural Formula (1)

In Structural Formula (1), n and m are integers of 0 to 3, where n+m=3. Y1 represents any of an alkyl group, a chloro group, or a bromo group. R represents a hydrogen atom or an alkyl group.

The other end of the fluorine compound A preferably has a $CF_3$ structure ($CF_3$ group). This is because $CF_3$ has small surface free energy and can develop high ink repellency.

The main chain structure of the fluorine compound A preferably has a perfluoropolyether structure (hereinafter may be referred to as PFPE) from the viewpoint of ensuring water repellency and sliding resistance. The PFPE structure preferably has at least one of the following repeating structures of Structural Formulas (2) to (5):

Structural Formula (2)

$$-\!\!\left[CF_2-CF_2-CF_2-O\right]_{n1}\!\!-$$

Structural Formula (3)

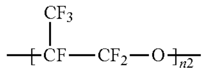

Structural Formula (4)

$$-\!\!\left[CF_2-O\right]_{n3}\!\!-$$

Structural Formula (5)

$$-\!\!\left[CF_2-CF_2-O\right]_{n4}\!\!-$$

wherein in Structural Formulas (2) to (5), n1 to n4 each represent an integer of 1 or more.

Preferred specific examples of the fluorine compound A include compounds represented by Structural Formulas (6) to (8):

Structural Formula (6)

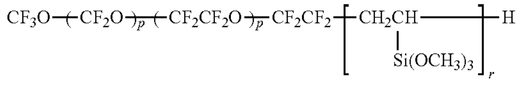

(wherein p, q, and r each represent an integer of 1 or more)

Structural Formula (7)

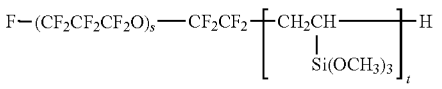

(wherein s and t each represent an integer of 1 or more)

Structural Formula (8)

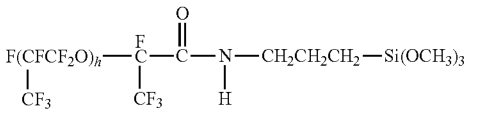

Examples of materials that can be used as a material having a reactive silyl group only at one end and a PFPE structure in the main chain include Optool DSX (manufactured by Daikin Industries, Ltd.), X-71-195 and KY-108 (both manufactured by Shin-Etsu Chemical Co., Ltd.), and SC100 (manufactured by Canon Optron, Inc.).

Fluorine Compound B

The fluorine compound B is a fluorine-containing silane coupling agent having an average molecular weight smaller than the fluorine compound A. Because the fluorine compound B has a smaller average molecular weight, it is less likely to become a steric hindrance than the fluorine compound A, and can easily approach the base film through the gaps in the fluorine compound A, thus forming siloxane bonds at high density with the base film. This enables the formation of a dense ink-repellent film by filling in the gaps of the previously bonded fluorine compound A, and prevents a part of the base film from being exposed unbound and coming into contact with the ink.

The fluorine compound B may be a molecule having the same structural formula as the fluorine compound A and having a small number of main chain repeats, but from the viewpoint of reducing steric hindrance, the structural formula of the fluorine compound B may be different from the structural formula of the fluorine compound A. The average molecular weight of the fluorine compound B is preferably 1000 or less, and more preferably 500 or less. The average molecular weight of the fluorine compound B can be calculated as a number average molecular weight by measuring $^{19}$F-NMR. It may also be calculated as the sum of atomic weight from the chemical structural formula.

The fluorine compound B has a linear main chain structure and forms a siloxane bond (siloxane structure) with the silicon oxide of the base film only at a one end of the two ends of the main chain. In order to form a siloxane bond, the fluorine compound B has at least one reactive silyl group represented by the following structural formula (9). Since it has a reactive silyl group at only one end, the reaction of the fluorine compounds with each other can be suppressed:
Structural formula (9)

Si(Y1)n(OR)m wherein in Structural Formula (9), n and m are integers of 0 to 3, where n+m=3; Y1 represents an alkyl group, a chloro group, or a bromo group; and R represents a hydrogen atom or an alkyl group.

Furthermore, the reactive silyl group of the fluorine compound B preferably has a structure represented by the following Structural Formula (10) or (11). Since there is only one functional group capable of siloxane bonding, the reaction between fluorine compounds is further suppressed, and the siloxane bond density can be further increased:
Structural Formula (10)

$Si(OR)(CH_3)_2$ wherein in Structural Formula (10), R represents a hydrogen atom or an alkyl group;
Structural Formula (11)

$Si(Y2)(CH_3)_2$ wherein in Structural Formula (11), Y2 represents a chloro group or a bromo group.

The other end of the fluorine compound B preferably has a $CF_3$ structure ($CF_3$ group). The $CF_3$ structure has small surface free energy and can develop high ink repellency.

The main chain structure of the fluorine compound B is preferably a perfluoroalkylene structure ($—(CF_2)_n—$).

Preferred specific examples of the fluorine compound B include compounds represented by Structural Formulas (12) to (15):

Structural Formula (12)

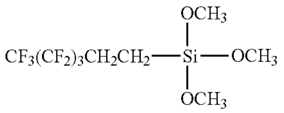

Structural Formula (13)

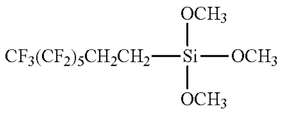

Structural Formula (14)

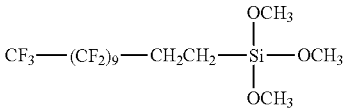

Structural Formula (15)

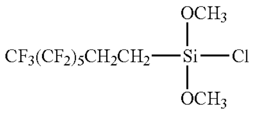

Examples of other materials suitable as the fluorine compound B include a material in which the chloro group at the right end in the structural formula (15) is substituted with an OR group (R is an alkyl group), and a material in which the repeat number 5 in $(CF_2)_5$ is another integer of 0 or more.

Method for Forming Ink-Repellent Film

Figure 2:
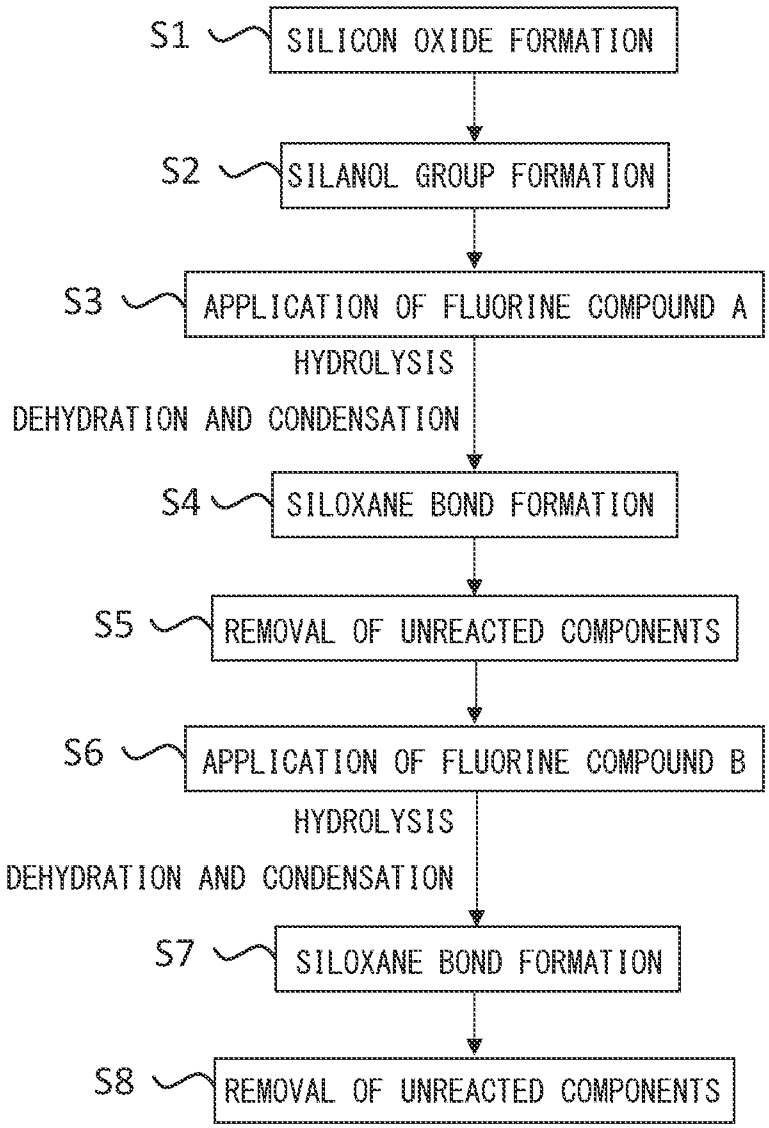
FIG. 2 is a process chart illustrating a procedure for forming an ink-repellent film according to the first embodiment.

Next, a method of forming the ink-repellent film containing the fluorine compound A and the fluorine compound B on the base film containing silicon oxide will be described. FIG. 2 is a process chart illustrating a procedure for forming an ink-repellent film. The ink-repellent film including the fluorine compound A and the fluorine compound B can be formed by a silane coupling treatment.

Figure 3A:
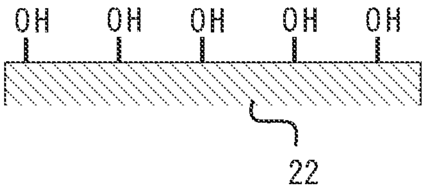
FIG. 3A is a schematic view showing a stage where a base film is formed.

First, as schematically illustrated in FIG. 3A, a base film 22 containing silicon oxide is formed on the substrate of the orifice plate 6 (ink-repellent member) (step S1). Silicon oxide is formed by, for example, oxidizing silicon as a substrate or silicon carbide (SiC) formed on silicon by heat, plasma, UV, or the like. Other examples include sputter deposition using a silicon oxide target, an atomic layer deposition (ALD) method, a chemical vapor deposition (CVD) method, and a spin coating method. However, the method for forming the silicon oxide is not limited thereto. Then, silanol groups are formed on the surface of the base film 22 (step S2). In FIG. 3A, only the hydroxyl group portions of the silanol groups are schematically shown.

Next, the fluorine compound A is applied to the surface of the base film 22 on which the silanol groups are formed (step S3). The coating method is not particularly limited, and examples thereof include a vacuum vapor deposition method, a heating vapor deposition method, a spray coating method, a spin coating method, and a dip coating method.

Subsequently, alkoxysilyl and halogenated silyl groups at the end of the fluorine compound A are then hydrolyzed and converted to silanol groups. Then, siloxane bonds are formed by a dehydration condensation reaction between the silanol groups of the fluorine compound A and the silanol groups formed on the base film 22 (step S4).

Hydrolysis is caused by exposure to moisture and also by adsorbed water present on the surface of the base film, but can be accelerated by making the environment highly humid (for example, 60% RH to 100% RH). The dehydration condensation reaction also occurs at room temperature, but can be accelerated by increasing the temperature (for example, 60° C. to 150° C. ). The reaction time can be appropriately selected according to humidity and temperature, and for example, the reaction time is about 2 hours at 60° C. and 80% RH.

Figure 3B:
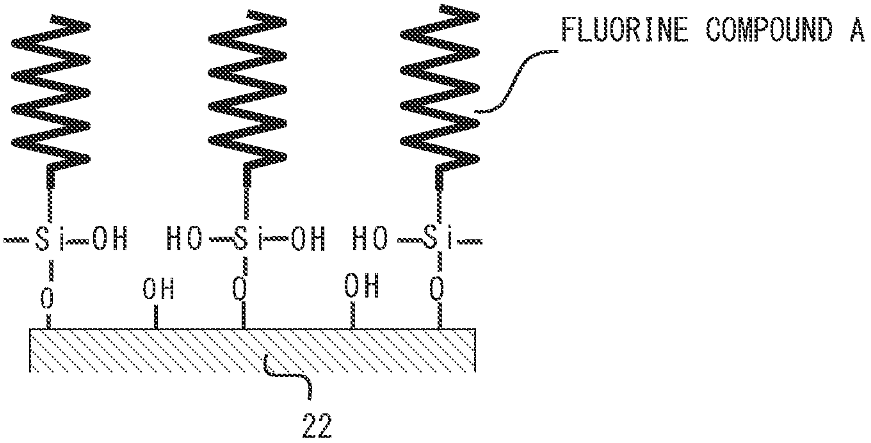
FIG. 3B is a schematic view showing a state in which siloxane bonds are formed by a fluorine compound A having a large molecular weight.

As schematically shown in FIG. 3B, in the step S4, the fluorine compound A cannot be densely arranged on the surface of the base film 22 due to steric hindrance caused by its large molecular weight. In other words, unbound silanol groups are scattered on the surface of the base film 22.

Subsequently, washing is performed to remove residual unbound portions of the fluorine compounds (step S5). The washing method is not particularly limited. For example, the orifice plate 6 may be immersed in a fluorinated solvent compatible with the fluorine compounds. At this time, the fluorinated solvent may be heated or ultrasonic waves may be applied to the solvent as necessary.

Next, the fluorine compound B is applied to the surface of the base film 22 on which the unbound silanol groups are scattered (step S6). The coating method is not particularly limited, and examples thereof include a vacuum vapor deposition method, a heating vapor deposition method, a spray coating method, a spin coating method, and a dip coating method.

Subsequently, alkoxysilyl and halogenated silyl groups at the end of the fluorine compound B are then hydrolyzed and converted to silanol groups. Then, siloxane bonds are formed by a dehydration condensation reaction between the silanol groups of the fluorine compound A and the unbound silanol groups scattered on the base film 22 (step S7).

Hydrolysis is caused by exposure to moisture and also by adsorbed water present on the surface of the base film, but can be accelerated by making the environment highly humid (for example, 60% RH to 100% RH). The dehydration condensation reaction also occurs at room temperature, but can be accelerated by increasing the temperature (for example, 60° C. to 150° C. ) The reaction time can be appropriately selected according to humidity and temperature, and for example, the reaction time is about 2 hours at 60° C. and 80% RH.

Figure 3C:
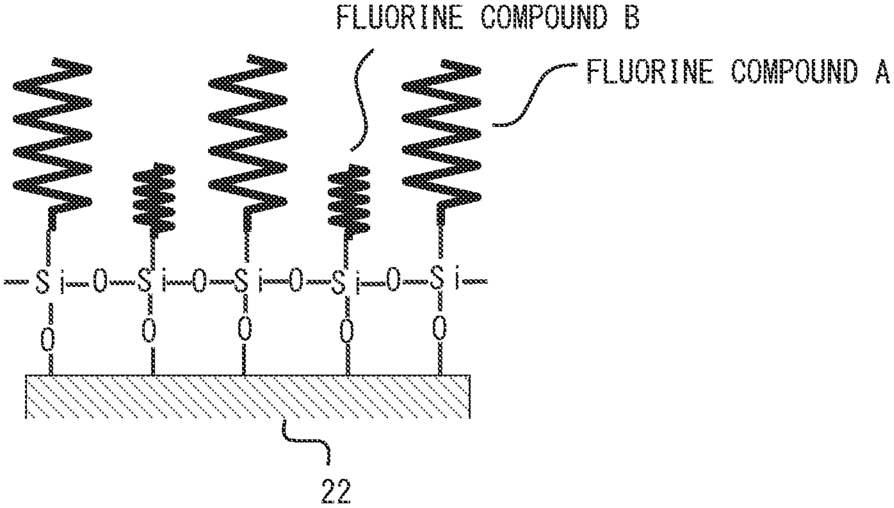
FIG. 3C is a schematic view showing a state in which siloxane bonds are formed by a fluorine compound B having a small molecular weight.

At this stage, as schematically shown in FIG. 3C, the fluorine compound B having a small molecular weight reaches the surface of the base film 22 through gaps in the fluorine compound A and forms siloxane bonds. As a result, in other words, siloxane is densely arranged on the surface of the base film 22.

Subsequently, washing is performed to remove residual unbound portions of the fluorine compounds (step S8). The washing method is not particularly limited. For example, the orifice plate 6 may be immersed in a fluorinated solvent compatible with the fluorine compounds. At this time, the fluorinated solvent may be heated or ultrasonic waves may be applied to the solvent as necessary.

As described above, in the ink-repellent film (ink-repellent member) according to the present embodiment, the process of forming siloxane bonds using the fluorine compound A having a large molecular weight is performed, and then the process of forming siloxane bonds using the fluorine compound B having a relatively small molecular weight is performed.

In the related art method, the ink-repellent treatment was performed using only a fluorine compound having a large molecular weight to ensure sliding resistance, but in other words, which can be said to have formed the condition shown in FIG. 3B. Due to steric hindrance, the siloxane did not cover the substrate surface densely enough, which allowed ink to penetrate into the base surface and did not ensure sufficient ink resistance.

In the present embodiment, as schematically shown in FIG. 3C, the siloxane structure is densely arranged on the base film 22, and the fluorine compounds cover the surface of the base film. Siloxane having a large molecular weight derived from the fluorine compound A contributes to ensuring sliding resistance, while siloxane having a small molecular weight derived from the fluorine compound B covers the underlayer without gaps, thereby suppressing ink penetration into the base layer. Therefore, according to the present embodiment, an ink-repellent film (ink-repellent member) having both excellent sliding resistance and ink resistance can be provided.

In the coating treatment using the fluorine compounds A and B, the order in which the compounds are coated is important. For example, if the fluorine compound B is used first, or if the fluorine compounds A and B are used at the same time, a dense film is formed, but the bonding of the fluorine compound A is inhibited, so the sliding resistance may be insufficient.

In order to form an ink-repellent film (ink-repellent member) having both excellent sliding resistance and ink resistance, it is desirable that the relationship expressed in the following formula (1) be established between the number of molecules of the fluorine compound A ($N_A$) and the number of molecules of the fluorine compound B ($N_B$) in the ink-repellent film.

$$N_A/(N_A N_B) \leq 0.75 \qquad \text{Formula (1)}$$

The value of $N_A/(N_A+N_B)$ is preferably 0.75 or less in order to densely fill the gaps of the fluorine compound A with the fluorine compound B while keeping the number $N_A$ of molecules of the fluorine compound A to a certain size to ensure sufficient sliding resistance. The value of $N_A/(N_A+N_B)$ can be obtained, for example, by measuring the ink-repellent film by XPS (X-ray electron spectroscopy), analyzing the bonding state of C1s, and calculating the area ratio of the bound species. In particular, when comparing a compound having a main chain structure in which an oxygen atom is further bonded to fluorine-bonded carbon, such as a perfluoropolyether structure, and a compound in which only carbon is bonded to fluorine-bonded carbon, such as a perfluoroalkylene structure, the binding energy of the $CF_2$ group shifts toward the higher energy side in the former, making it possible to calculate the area ratio.

EXAMPLES

Specific examples and comparative examples will be described below. The specifications of the ink-repellent films (ink-repellent members) according to Examples 1 to 6 and Comparative Examples 1 to 3 are summarized in Table 1 below.

TABLE 1

| | Base film Material type | Fluorine compound A Material type | Fluorine compound A Average molecular weight | Fluorine compound B Material type | Fluorine compound B Average molecular weight | $N_A/(N_A + N_B)$ |
|---|---|---|---|---|---|---|
| Example 1 | $SiO_2$ | FA-1 | 5000 | FB-1 | 440 | 0.60 |
| Example 2 | $SiO_2$ | FA-2 | 3900 | FB-1 | 440 | 0.65 |
| Example 3 | $SiO_2$ | FA-3 | 1550 | FB-1 | 440 | 0.72 |
| Example 4 | $SiO_2$ | FA-1 | 5000 | FB-2 | 668 | 0.63 |
| Example 5 | $SiO_2$ | FA-1 | 5000 | FB-3 | 468 | 0.61 |
| Example 6 | $SiC/SiO_2$ | FA-1 | 5000 | FB-1 | 440 | 0.60 |
| Comparative Example 1 | $SiO_2$ | FA-1 | 5000 | — | — | — |
| Comparative Example 2 | $SiO_2$ | — | — | FB-1 | 440 | — |
| Comparative Example 3 | $SiO_2$ | FA-4 | 1300 | FB-1 | 440 | 0.77 |

The abbreviations listed in Table 1 are as follows.

FA-1: A compound represented by Structural Formula (6) and having an average molecular weight of 5000, specifically, X-71-195 manufactured by Shin-Etsu Chemical Co., Ltd.

FA-2: A compound represented by Structural Formula (7) and having an average molecular weight of 3900, specifically, OPTOOL DSX manufactured by Daikin Industries, Ltd.

FA-3: A compound represented by Structural Formula (8) and having an average molecular weight of 1550, which is synthesized with reference to Japanese patent publication, JP 2001-152050 A.

FA-4: A compound represented by Structural Formula (8) and having an average molecular weight of 1300, which is synthesized with reference to Japanese patent publication, JP 2001-152050 A.

FB-1: A compound represented by Structural Formula (15) and manufactured by Tokyo Chemical Industry Co., Ltd.

FB-2: A compound represented by Structural Formula (14) and manufactured by Gelest Inc.

FB-3: A compound represented by Structural Formula (13) and manufactured by Tokyo Chemical Industry Co., Ltd.

Example 1

A Φ3 inch silicon substrate is heated to 900° C. in an oxygen atmosphere to form a thermal oxide film containing $SiO_2$ as a base film on the substrate surface. Next, the silicon substrate on which the base film was formed was placed in a vacuum deposition machine, and the fluorine compound A (FA-1) was deposited on the surface where the base film was formed. FA-1 is a compound represented by Structural Formula (6) and having an average molecular weight of 5000, and may be, for example, X-71-195 manufactured by Shin-Etsu Chemical Co., Ltd.

Steel wool is impregnated with 60 mg of FA-1, placed in a Cu container, and the Cu container is heated by resistance heating to evaporate FA-1. Subsequently, the silicon substrate on which FA-1 is deposited is placed in a thermo-hygrostat, and allowed to stand for 2 hours at 60° C. and 80% RH. If unbound FA-1 is found when touching the surface of the silicon substrate removed from the thermo-hygrostat, the silicon substrate is immersed in a fluorinated solvent (Novec™7300, manufactured by 3M Company) for 30 seconds to wash and remove unbound FA-1 adhering to the surface. The washing is repeated three times with a fresh fluorinated solvent.

Subsequently, the washed silicon substrate and the glass container containing 0.4 ml of the fluorine compound B (FB-1) are placed in a fluororesin container, and the fluororesin container is sealed with a lid. FB-1 is a compound represented by Structural Formula (15), and may be, for example, a reagent manufactured by Tokyo Chemical Industry Co., Ltd. The sealed fluororesin container is placed in an oven and allowed to stand for 3 hours at 120° C. Thereafter, the silicon substrate removed from the fluororesin container is immersed in a fluorinated solvent (Novec™ 7300, manufactured by 3M Company) for 30 seconds to wash the surface. The washing is repeated three times with a fresh fluorinated solvent. After washing, the fluorinated solvent is removed by air drying.

The formed ink-repellent film is subjected to XPS measurement to perform bonding analysis of C1s (measuring apparatus: Quantera SXM, manufactured by ULVAC-PHI, Incorporated). $N_A/(N_A+N_B)$ was calculated from the area of the peak derived from the $(OCF_2)$ repeating structure of FA-1 (294.6 eV) and the area of the peak derived from the $(CF_2)$ repeating structure of FB-1 (291.9 eV) and found to be 0.60.

Examples 2 to 5

The ink-repellent film according to each Example is produced in the same manner as in Example 1, except that the materials shown in Table 1 are used as the fluorine compound A and the fluorine compound B.

Example 6

A SiC film formed on a silicon substrate surface by a CVD method is subjected to UV ozone treatment, and an oxidation treatment film containing SiC and $SiO_2$ is used as a base film. Except for the above, an ink-repellent film is formed in the same manner as in Example 1 (UV ozone treatment apparatus: UV-312, manufactured by Technovision, Inc., treatment time: 360 seconds).

Comparative Example 1

An ink-repellent film according to Comparative Example 1 is formed in the same manner as in Example 1, except that only FA-1 is used instead of FB-1 as the fluorine compound.

Comparative Example 2

An ink-repellent film according to Comparative Example 2 is formed in the same manner as in Example 1, except that only FB-1 is used instead of FA-1 as the fluorine compound.

Comparative Example 3

An ink-repellent film according to Comparative Example 3 is formed in the same manner as in Example 1, except that FA-4 is used instead of FA-1 as the fluorine compound.

Next, methods for evaluating ink-repellent films according to examples and comparative examples will be described.

Evaluation 1: Evaluation of Ink Resistance

The ink resistance of the prepared ink-repellent film is evaluated by the following procedure. An alkaline dye ink (BCI-7 C, manufactured by Canon Inc.) was used as the ink. The ink is placed in a PFA container, the ink-repellent film is immersed in the ink so that the entire film is in contact with the ink, and the container is sealed with a lid. The container is placed in the oven in this state and maintained at 70° C. for one week. After removing the ink-repellent film and washing it sufficiently with water to remove the ink, the contact angle was measured using the method described in Evaluation 3.

Evaluation 2: Evaluation of Sliding Resistance

The sliding resistance of the prepared ink-repellent film is evaluated by the following procedure. A high-density felt material (CS-7, manufactured by Taber Industries) as a sliding material is attached to a friction and wear tester (FPR-2100, manufactured by Rhesca Corporation), and a reciprocating sliding test of the ink-repellent film is performed. The sliding load is 650 g, the sliding width is 10 mm, the linear velocity is 50.8 mm/sec, and the number of sliding times is 15000. The contact angle of the ink-repellent film after sliding is measured by the method described in Evaluation 3.

Evaluation 3: Contact Angle Measurement

Using a micro contact angle meter (product name: Drop-Measure, manufactured by Microjet Corporation), a dynamic receding contact angle Or with respect to pure water is measured, and the contact angle is evaluated and ranked according to the following criteria.

A: 100° or more
B: 95° or more and less than 100°
C: 90° or more and less than 95°
D: 85° or more and less than 90°
E: Less than 85°

The evaluation results of the ink-repellent films (ink-repellent members) according to Examples 1 to 6 and Comparative Examples 1 to 3 are summarized in Table 2 below.

TABLE 2

| | Sliding resistance | Ink resistance |
|---|---|---|
| Example 1 | A | A |
| Example 2 | B | A |
| Example 3 | C | A |
| Example 4 | A | B |
| Example 5 | A | B |
| Example 6 | A | A |
| Comparative Example 1 | A | E |
| Comparative Example 2 | E | B |
| Comparative Example 3 | D | A |

In order to satisfy practicality as an ink-repellent film (ink-repellent member), the contact angle must be 90° or more. Therefore, it can be said that the ink-repellent films (ink-repellent members) according to Examples 1 to 6, which are A to C for both ink resistance and sliding resistance, have more excellent practical characteristics than the ink-repellent films (ink-repellent members) according to Comparative Examples 1 to 3.

Second Embodiment

The second embodiment will be described focusing on differences from the first embodiment.

Base of Ink-Repellent Film

The base of the ink-repellent film provided on the outer surface of the orifice plate 6 (orifice surface 6*a*) includes tantalum oxide. Tantalum oxide may be tantalum dioxide or tantalum pentoxide, but is preferably tantalum pentoxide in the present embodiment. Tantalum pentoxide can be formed on silicon, which is a base material of the orifice plate 6, by, for example, sputter deposition, an atomic layer deposition (ALD) method, or a chemical vapor deposition (CVD) method. ALD is preferred from the viewpoint of film densification.

Fluorine Compound B

Of the ends of the linear structure of the fluorine compound B, the end on the side that reacts with the base film preferably have a phosphonic acid structure. Specifically, the end has the structure represented by the following structural formula (16):

Structural Formula (16)

$P(=O)(OH_1$

Figure 5A:
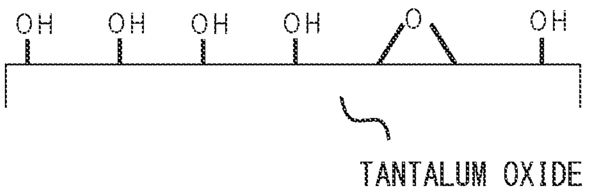
FIG. 5A is a schematic view showing a stage where a base film including tantalum oxide is formed.
Figure 5B:
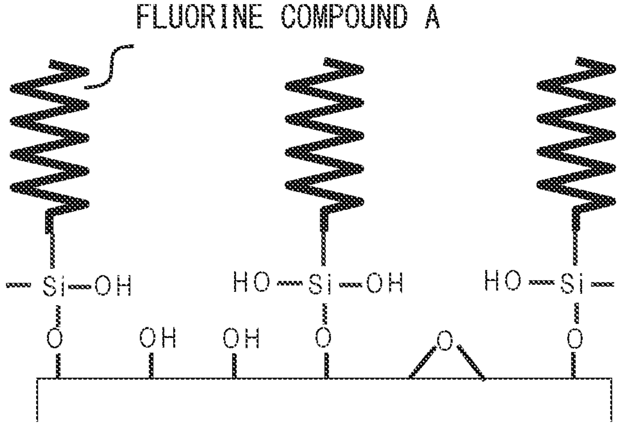
FIG. 5B is a schematic view showing a state in which siloxane bonds are formed by a fluorine compound A having a large molecular weight.
Figure 5C:
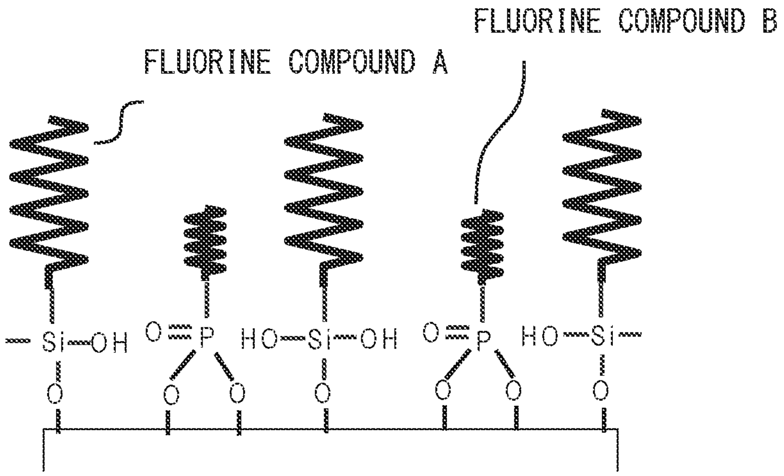
FIG. 5C is a schematic view showing a state in which phosphonate ester bonds are formed by a fluorine compound B having a small molecular weight.

The phosphonic acid disposed at first end of the linear structure forms a phosphonate ester bond by dehydration condensation with an OH group formed on the base film (FIG. 5C). Since protons (H+) can be supplied to the surface of the base film and react with O of the inorganic oxide contained in the base film to form OH groups, this allows the formation of reaction points at high density. In particular, when the base film is tantalum pentoxide having a high O content, the reaction density of the fluorine compound B can be increased.

Preferred specific examples having a phosphonic acid structure at the end include compounds represented by Structural Formulas (17) to (19).

(Structural Formula (17)

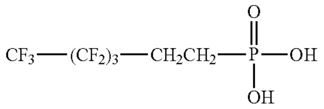

(Structural Formula (18)

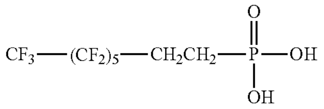

(Structural Formula (19)

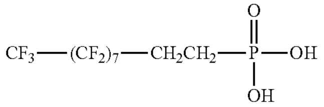

Method for Forming Ink-Repellent Film

Figure 4:
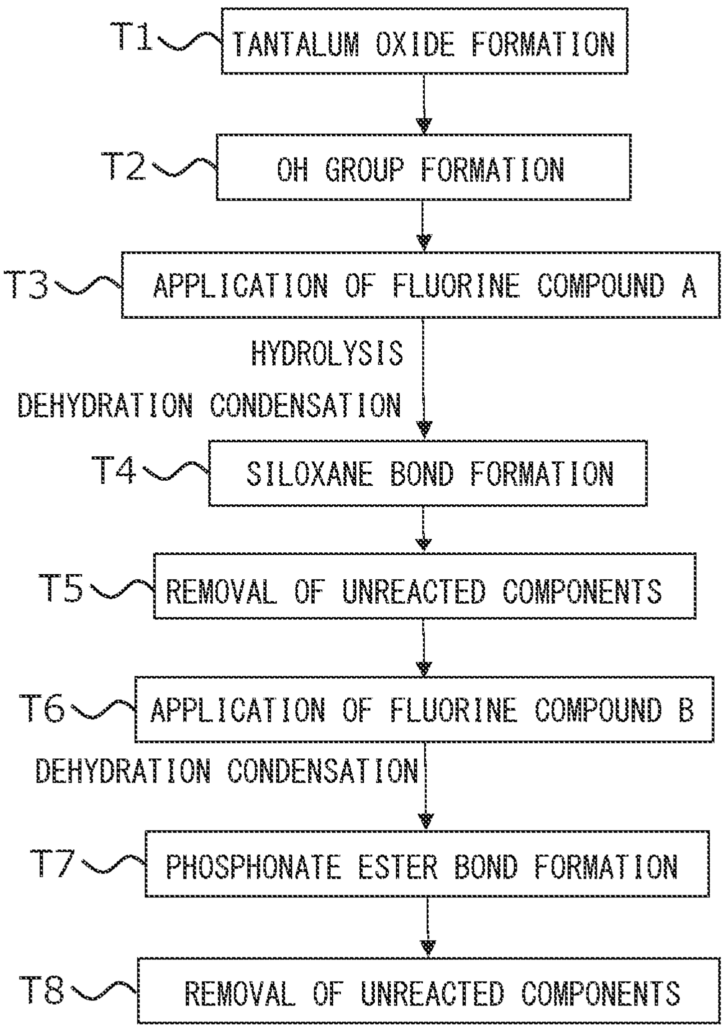
FIG. 4 is a process chart illustrating a procedure for forming an ink-repellent film according to the second embodiment.

A method for forming an ink-repellent film containing the fluorine compound A and the fluorine compound B having a phosphonic acid structure on a base film containing tantalum oxide is described. FIG. 4 is a process chart illustrating a procedure for forming an ink-repellent film.

First, as schematically illustrated in FIG. 5A, a base film 22 containing tantalum pentoxide is formed on the substrate of the orifice plate 6 (ink-repellent member) (step T1). For example, an atomic layer deposition (ALD) method is used to form the tantalum pentoxide on a surface of the silicon substrate or on a surface where a thermal oxide film is formed by heating the silicon substrate. Then, OH groups are formed on the surface of the base film 22 (step T2). The method for forming OH groups is not particularly limited, and examples thereof include plasma treatment and UV treatment. In FIG. 5A, only the hydroxyl group portions are schematically shown.

Next, the fluorine compound A is applied to the surface of the base film 22 on which the OH groups are formed (step T3). The coating method is not particularly limited, and examples thereof include a vacuum vapor deposition method, a heating vapor deposition method, a spray coating method, a spin coating method, and a dip coating method.

Subsequently, alkoxysilyl and halogenated silyl groups at the end of the fluorine compound A are then hydrolyzed and converted to silanol groups. Then, siloxane bonds are formed by a dehydration condensation reaction between the silanol groups of the fluorine compound A and the OH groups formed on the base film 22 (step T4).

Hydrolysis is caused by exposure to moisture and also by adsorbed water present on the surface of the base film, but can be accelerated by making the environment highly humid (for example, 60% RH to 100% RH). The dehydration condensation reaction also occurs at room temperature, but can be accelerated by increasing the temperature (for example, 60° C. to 150° C. ). The reaction time can be appropriately selected according to humidity and temperature, and for example, the reaction time is about 2 hours at 60° C. and 80% RH.

As schematically shown in FIG. 5B, in the step T4, the fluorine compound A cannot be densely arranged on the surface of the base film 22 due to steric hindrance caused by its large molecular weight. In other words, unbound OH groups are scattered on the surface of the base film 22.

Subsequently, washing is performed to remove residual unbound portions of the fluorine compounds (step T5). The washing method is not particularly limited. For example, the orifice plate 6 may be immersed in a fluorinated solvent compatible with the fluorine compounds.

Next, the fluorine compound B is applied to the surface of the base film 22 on which the unbound OH groups are scattered (step T6). The coating method is not particularly limited, and examples thereof include a vacuum vapor deposition method, a heating vapor deposition method, a spray coating method, a spin coating method, and a dip coating method. A solution containing the fluorine compound B may be prepared and applied.

Subsequently, a dehydration condensation reaction is performed between the phosphonic acid of the fluorine compound B and unbound OH groups scattered on the base film 22 to form phosphonate ester bonds (step T7).

At this stage, as schematically shown in FIG. 5C, the fluorine compound B having a small molecular weight reaches the surface of the base film 22 through gaps in the fluorine compound A and forms phosphonate ester bonds.

Subsequently, washing is performed to remove residual unbound portions of the fluorine compound B (step T8). The washing method is not particularly limited. For example, the orifice plate 6 may be immersed in a fluorinated solvent compatible with the fluorine compounds.

Example 7

Tantalum pentoxide ($Ta_2O_5$) was deposited on a Φ3-inch silicon substrate at a thickness of 100 nm using an ALD apparatus (SUNALE R200, manufactured by Picosun). Next, the silicon substrate on which the tantalum pentoxide was formed as a base film was placed in a chamber of a plasma processing apparatus (MAS-8220 AT, manufactured by Canon Marketing Japan Inc.), and the surface of the base film was processed.

Next, the silicon substrate was placed in a vacuum evaporator, and the fluorine compound A (FA-1) was deposited on the surface of the base film. If unbound FA-1 is found on the surface of the silicon substrate removed from the vacuum evaporator, the silicon substrate is immersed in a fluorinated solvent (Novec™ 7300, manufactured by 3M Company) for 30 seconds to wash and remove unbound FA-1 adhering to the surface. The washing is repeated three times with a fresh fluorinated solvent.

Subsequently, the washed silicon substrate was immersed in a 1 mM methanol solution of the fluorine compound B (FB-4), and maintained in the immersed state for 80 minutes.

The silicon substrate was removed, the methanol was air-dried, and the silicon substrate was placed in an oven and heated at 120° C. for 1 hour. The silicon substrate was immersed in methanol for 30 seconds to remove unbound portions of the FB-4 adhering to the surface. The washing was repeated three times with fresh methanol.

Examples 8 and 9

The ink-repellent film according to each Example was produced in the same manner as in Examples 7 and 1, except that the materials shown in Table 3 are used as the base materials, the fluorine compound A, and the fluorine compound B.

TABLE 3

| | Base | Fluorine compound A | | Fluorine compound B | | |
|---|---|---|---|---|---|---|
| | film Material type | Material type | Average molecular weight | Material type | Average molecular weight | $N_A$ $(N_A + N_B)$ |
| Example7 | $Ta_2O_5$ | FA-1 | 5000 | FB-4 | 428 | 0.55 |
| Example8 | $Ta_2O_5$ | FA-1 | 5000 | FB-1 | 440 | 0.60 |
| Example9 | $SiO_2$ | FA-1 | 5000 | FB-4 | 428 | 0.60 |

The evaluation results of the ink-repellent films (ink-repellent members) according to Examples 7 to 9 are summarized in Table 4 below.

TABLE 4

| | Sliding resistance | Ink resistance |
|---|---|---|
| Example7 | A | A |
| Example8 | A | A |
| Example9 | A | A |

Note that the base film of the above-described embodiment is configured to contain either silicon oxide or tantalum oxide, but it may be a base film that contains both silicon oxide and tantalum oxide. Even in that case, first, the fluorine compound A having a large average molecular weight is attached to the base film via siloxane bonds. Thereafter, the fluorine compound B having an average molecular weight smaller than that of the fluorine compound A is attached to the base film via either or both siloxane bonds or phosphonate ester bonds. As a result, a water-repellent film having excellent sliding resistance and ink resistance can be formed.

Note that the present invention is not limited to the embodiments and examples described above, and many modifications can be made within the technical concept of the present invention.

For example, although not shown in the examples, when using a water-repellent film material having a skeleton of Structural Formula [(3) or Structural Formula (4), for example, a water-repellent film made of perfluoropolyether can be formed using FG-5083SH manufactured by Fluoro Technology, Co., Ltd.

The ink-repellent film according to the present embodiment is typically a film including the fluorine compound A and the fluorine compound B. However, this does not mean that the film must not contain other components, and may include other materials as long as sliding resistance and ink resistance are ensured. For example, the film may contain impurities that are unavoidable in its production.

In order to manufacture an inkjet head, wafers may be laminated together to form a single unit that corresponds to a plurality of inkjet heads, an ink-repellent film may be applied to the outer surface of the orifice plate portion, and the unit may then be diced into individual inkjet heads. Alternatively, for each single inkjet head, the flow path substrate and the orifice plate may be prepared as components, and then the ink-repellent film may be formed. Instead of assembling the inkjet head and then applying the water-repellent film, the inkjet head may be assembled after applying the water-repellent film to the orifice plate in advance.

Since the ink-repellent film according to the present embodiment can be provided on any member required to have ink repellency, the ink-repellent member is not necessarily limited to the orifice plate of the inkjet head.

The present invention can provide an ink-repellent member and an inkjet head having both excellent sliding resistance and ink resistance. An inkjet head that maintain ink repellency over a long period of time, even when wiping is performed, can be realized.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-195669, filed Dec. 7, 2022, and Japanese Patent Application No. 2023-181941, filed Oct. 23, 2023 which are hereby incorporated by reference herein in their entirety.

What is claimed is:

1. An ink-repellent member, comprising:

a base including at least one selected from the group consisting of silicon oxide and tantalum oxide; and an ink-repellent film including a fluorine compound chemically bonded to the base via at least a siloxane bond, wherein the fluorine compound includes a fluorine compound A having a linear molecular structure and an average molecular weight of 1500 or more, and a fluorine compound B having a linear molecular structure and a smaller average molecular weight than the fluorine compound A, wherein the fluorine compound A has a siloxane structure only at one end of the linear molecular structure, and wherein the fluorine compound B has a siloxane structure only at one end of the linear molecular structure and is represented by structural formula (1):

(1)

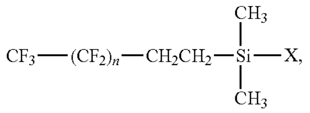

wherein:

X is an OR group or a chloro group, and R is an alkyl group; and n is an integer of 0 or more.

2. The ink-repellent member according to claim 1, wherein the fluorine compound B has the average molecular weight of 1000 or less.

3. The ink-repellent member according to claim 1, wherein the fluorine compound A has a main chain including a perfluoropolyether structure and has a $CF_3$ group at an end.

4. The ink-repellent member according to claim 1, wherein the fluorine compound B has a main chain including a perfluoroalkylene structure.

5. The ink-repellent member according to claim 1, wherein the fluorine compound A has the average molecular weight of 4000 or more.

6. The ink-repellent member according to claim 1, wherein the fluorine compound A includes at least one selected from the group consisting of repeating structures represented by structural formulas (2) to (5):

$$-(CF_2-CF_2-CF_2-O)_{n1}- \quad (2)$$

(3)

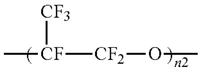

$$-(CF_2-O)_{n3}- \quad (4)$$

$$-(CF_2-CF_2-O)_{n4}-. \quad (5)$$

7. The ink-repellent member according to claim 1, wherein a number of molecules of the fluorine compound A ($N_A$) and a number of molecules of the fluorine compound B ($N_B$) in the fluorine compound satisfy a relationship $N_A/(N_A+N_B) \leq 0.75$.

* * * * *